(12) United States Patent
Cai

(10) Patent No.: US 12,054,051 B2
(45) Date of Patent: Aug. 6, 2024

(54) IN-WHEEL DRIVE SYSTEM AND MOTOR VEHICLE

(71) Applicant: Schaeffler Technologies AG & Co. KG, Herzogenaurach (DE)

(72) Inventor: Xiangyang Cai, Wuhan (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 389 days.

(21) Appl. No.: 17/436,088

(22) PCT Filed: Mar. 13, 2019

(86) PCT No.: PCT/CN2019/077958
§ 371 (c)(1),
(2) Date: Sep. 3, 2021

(87) PCT Pub. No.: WO2020/181519
PCT Pub. Date: Sep. 17, 2020

(65) Prior Publication Data
US 2022/0048378 A1    Feb. 17, 2022

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *F16H 1/28* (2013.01); *F16H 57/02* (2013.01); *H02K 7/006* (2013.01); *H02K 7/116* (2013.01); *F16H 2057/02034* (2013.01); *F16H 2057/02052* (2013.01)

(58) Field of Classification Search
CPC .......... B60K 7/0007; B60K 2007/0038; B60K 2007/0092
See application file for complete search history.

(56) References Cited

U.S. PATENT DOCUMENTS

| 4,402,374 A | 9/1983 | Knur et al. |
| 6,722,459 B1 | 4/2004 | Wendl et al. |

(Continued)

FOREIGN PATENT DOCUMENTS

| CN | 102139628 A | 8/2011 |
| CN | 102756641 A | 10/2012 |

(Continued)

*Primary Examiner* — Brian L Swenson
(74) *Attorney, Agent, or Firm* — Volpe Koenig

(57) ABSTRACT

An in-wheel drive system includes a hub, a driving motor, a rotor support fixed to a rotor of the driving motor on the inner radial side of the rotor, and planetary gear reducers. The planetary gear reducer comprises a sun gear shaft, a planetary gear, a ring gear, and a planetary gear carrier, wherein the sun gear shaft is fixed to the rotor support on the outer radial side of the hub, and the planetary gear carrier is fixed to the hub. A driving force/torque is transmitted to the hub via the rotor, the rotor support, the sun gear shaft, the planetary gear, and the planetary gear carrier. The in-wheel drive system removes the need for a conventional transmission half axle, differential, and other transmission parts, shortens the transmission chain, is conducive to the vehicle layout design, and can easily implement torque vector control.

14 Claims, 1 Drawing Sheet

(51) Int. Cl.
  *F16H 1/28*    (2006.01)
  *F16H 57/02*   (2012.01)
  *H02K 7/00*    (2006.01)
  *H02K 7/116*   (2006.01)

(56) References Cited

U.S. PATENT DOCUMENTS

| | | | |
|---|---|---|---|
| 10,876,596 B1* | 12/2020 | Bonny | F16D 65/186 |
| 2005/0236198 A1* | 10/2005 | Jenkins | B60L 7/24 |
| | | | 180/65.51 |
| 2008/0202832 A1* | 8/2008 | Ai | F16H 1/2818 |
| | | | 180/65.51 |
| 2009/0312134 A1* | 12/2009 | Schoon | H02K 7/116 |
| | | | 475/154 |
| 2013/0062466 A1* | 3/2013 | Sweet | B64C 25/405 |
| | | | 244/103 R |
| 2017/0313180 A1* | 11/2017 | Fliearman | F16D 13/76 |
| 2020/0378476 A1* | 12/2020 | Huang | F16D 23/02 |
| 2021/0031615 A1* | 2/2021 | Li | B60T 1/062 |

FOREIGN PATENT DOCUMENTS

| | | | |
|---|---|---|---|
| CN | 103029565 A | 4/2013 | |
| CN | 105939924 A | 9/2016 | |
| CN | 108544917 A | 9/2018 | |
| JP | 2005218245 A | 8/2005 | |
| JP | 2006213182 A | 8/2006 | |
| JP | 2010502494 A | 1/2010 | |
| JP | 2012116215 A | 6/2012 | |
| JP | 2013166437 A | 8/2013 | |
| KR | 19990085031 A | 12/1999 | |

\* cited by examiner

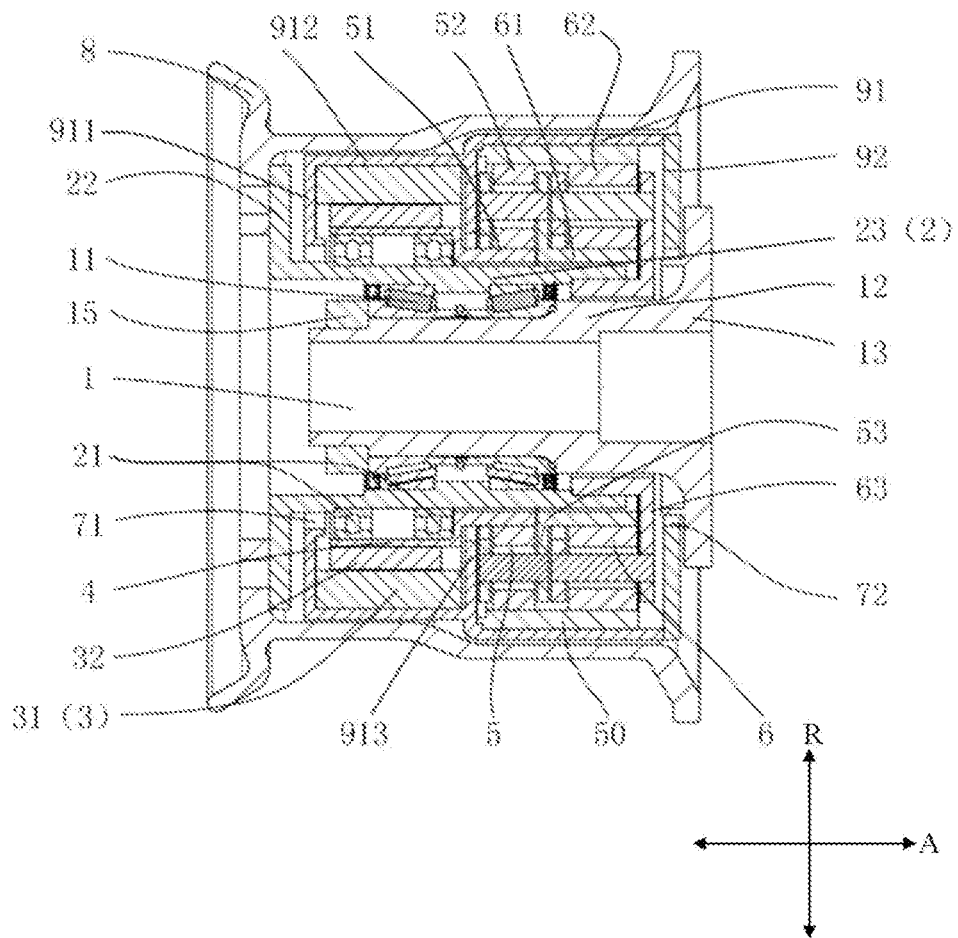

IN-WHEEL DRIVE SYSTEM AND MOTOR VEHICLE

CROSS-REFERENCE TO RELATED APPLICATIONS

This application is the U.S. National Phase of PCT Appln. No. PCT/CN2019077958 filed Mar. 13, 2019, the entire disclosure of which is incorporated by reference herein.

TECHNICAL FIELD

The present relates to the technical field of motor vehicles, and in particular to an in-wheel drive system for a motor vehicle and a motor vehicle comprising the same.

BACKGROUND

Existing motor vehicles, such as new energy buses, use a drive axle system composed of a central driving motor, a clutch, a transmission with two or three gears, a transmission shaft and conventional axles to drive wheels. However, numerous parts that are assembled in the existing drive axle system lead to a longer transmission chain, a higher power loss and lower system efficiency, which seriously affects the driving distance, a crucial factor for new energy vehicles.

In addition, a conventional axle further has a differential, which exerts a great influence on the layout design of a vehicle together with above-mentioned numerous parts. For a bus, steps are arranged above the above-mentioned numerous parts, which affects the passenger capacity of the bus as well as the activities of the passengers in the bus.

SUMMARY

It is desirable to overcome or at least alleviate the above-mentioned shortcomings existing in the prior art, and provide an in-wheel drive system that can shorten the transmission chain for driving a wheel and a motor vehicle comprising the in-wheel drive system.

An in-wheel drive system includes a hub, a driving motor, a rotor support, and planetary gear reducers. The driving motor includes a stator and a rotor that rotates relative to the stator on the inner radial side of the stator. The rotor support is rotatably supported on the outer radial side of the hub and fixed to the rotor on the inner radial side of the rotor. The planetary gear reducers include sun gear shafts, planetary gears, a ring gear, and planetary gear carriers. The sun gear shafts are fixed to the rotor support on the outer radial side of the hub. The planetary gears mesh with the sun gear shafts on the outer radial sides of the sun gear shafts. The ring gear meshes with the planetary gears on the outer radial sides of the planetary gears. The planetary gear carriers support the planetary gears. The planetary gear carrier is fixed to the hub, and a driving force/torque is transmitted to the hub via the rotor, the rotor support, the sun gear shafts, the planetary gears and the planetary gear carriers.

In at least one implementation, the in-wheel drive system has a mounting space located on the outer radial side of the hub, the planetary gear reducers and the driving motor are mounted in the mounting space, and the mounting space has a substantially uniform axial dimension when extending in a radial direction.

In at least one implementation, the in-wheel drive system further includes an axle, a housing and a housing cover, wherein the hub is supported on the outer radial side of an axle portion of the axle, the housing is located on the outer radial side of the hub, and the housing cover is located on an axial side of the hub. The housing, the housing cover, the hub and a flange portion of the axle encircle and form a mounting space for mounting the driving motor and the planetary gear reducers.

In at least one implementation, the planetary gear reducers are substantially located on an axial side of the driving motor.

In at least one implementation, the in-wheel drive system further includes a wheel bearing, wherein the wheel bearing supports the hub on the inner radial side of the hub, and the driving motor, the planetary gear reducers and the wheel bearing are coaxially arranged.

In at least one implementation, the in-wheel drive system includes a first stage planetary gear reducer and a second stage planetary gear reducer, wherein the sun gear shaft of the first stage planetary gear reducer is fixed to the rotor support, the planetary gear carrier of the second stage planetary gear reducer is fixed to the hub, and the sun gear shaft of the second stage planetary gear reducer is fixed to the planetary gear carrier of the first stage planetary gear reducer.

In at least one implementation, the sun gear shaft of the first stage planetary gear reducer and the rotor support are integrally formed.

In at least one implementation, the sun gear shaft of the second stage planetary gear reducer and the planetary gear carrier of the first stage planetary gear reducer are integrally formed.

In at least one implementation, the planetary gear of the first stage planetary gear reducer and the planetary gear of the second stage planetary gear reducer mesh with the same ring gear.

A motor vehicle may include the in-wheel drive system.

The in-wheel drive system directly drives the hub at a variable speed to drive a wheel, which removes the need for a conventional transmission half axle, differential, and other transmission parts, shortens the transmission chain, is conducive to the vehicle layout design, and can easily implement torque vector control.

BRIEF DESCRIPTION OF THE DRAWINGS

FIG. 1 shows a sectional view of a specific implementation of an in-wheel drive system in an axial direction.

DETAILED DESCRIPTION

Exemplary implementations of the in-wheel drive system are described below with reference to the drawings.

In this Specification, "axial direction", "radial direction" and "circumferential direction" refer to the axial direction, radial direction and circumferential direction of a wheel, respectively. An axial side refers to the right side as shown in FIG. 1, and the other axial side refers to the left side as shown in FIG. 1.

As shown in FIG. 1, an in-wheel drive system includes a hub 2, a driving motor 3, a rotor support 4, planetary gear reducers, a housing 91 and a housing cover 92 that are assembled together. The driving motor 3 outputs a rotational driving force to the hub 2 through the planetary gear reducers. The hub 2 is mounted on a rim 8 to transmit the rotational driving force to the rim 8 and to further drive a wheel, and at the same time, the hub 2 is supported on an axle 1.

The axle 1 is located in the wheel and is connected to a suspension of a vehicle to transmit the weight of the vehicle to the rim 8. The axle 1 comprises an axle portion 12 and a flange portion 13, wherein the flange portion 13 is fixed to an axial side of the wheel, and the axle portion 12 extends out from the center of the flange portion 13 toward the other axial side of the wheel, and thereby being located in the wheel. In the embodiment, the axle portion 12 and the flange portion 13 are integrally formed to constitute a flanged shaft.

The hub 2 comprises a first hub portion 22 and a second hub portion 23, wherein the second hub portion 23 is substantially cylindrical and extends generally from one end in an axial direction A of the wheel to the other end in the axial direction A of the wheel, and the other end of the first hub portion 22 that is located in the axial direction A of the second hub portion 23 is folded to form a flanging extending outward in a radial direction R. The first hub portion 22 is fixed to the rim 8. A wheel bearing 11 is arranged between the second hub portion 23 and the axle portion 12 of the axle 1. An outer ring of the wheel bearing 11 is supported on the second hub portion 23, and an inner ring of the wheel bearing 11 is supported on the axle portion 12 of the axle 1, so that the second hub portion 23 is supported on the outer radial side of the axle portion 12 of the axle 1 in the wheel.

A nut 15 is assembled to the axle portion 12 of the axle 1 in the wheel to mount the wheel bearing 11 to the axle portion 12, and the nut 15 is mounted to the axle portion 12 on the other axial side of the wheel bearing 11.

The housing 91 has an opening that is open to an axial side. The housing cover 92 and the housing 91 are butted in the axial direction A to cover the opening, so that the housing 91 and the housing cover 92 encircle and form a mounting space between the axle 1 and the rim 8, and the in-wheel drive system is mounted in the mounting space. The mounting space may be located on the outer radial side of the hub 2 (the second hub portion 23) and is formed into a closed space by means of the connection of the housing 91, the housing cover 92, the hub 2 (the second hub portion 23) and the axle 1. This can not only prevent oil leakage in the in-wheel drive system, but can also prevent muddy water from getting into the in-wheel drive system, specifically into the driving motor 3 and the planetary gear reducers.

The housing 91 has a first housing portion 911 and a second housing portion 912, wherein the second housing portion 912 is substantially cylindrical and extends generally from one end in the axial direction A to the other end in the axial direction A in the wheel, and the other end of the first housing portion 911 that is located in the axial direction A of the second housing portion 912 is folded to form a flanging extending inward in the radial direction R. The first housing portion 911 is located on an axial side of the first hub portion 22, and a first radial gap is formed between the first housing portion 911 and an end of the second hub portion 23 on the other axial side, wherein a first sealing member 71 is mounted in the first radial gap.

The second housing portion 912 has a spacer 913 extending inwardly in the radial direction R, and the spacer 913 divides the mounting space in the axial direction A into a first mounting space and a second mounting space.

The housing cover 92 is assembled with the housing 91 at one end in the axial direction A of the housing 91, and the axle portion 12 of the axle 1 passes through the center of the housing cover 92. A second radial gap is formed between the housing cover 92 and an end of the axle 1 on the other axial side (i.e., the flange portion 13), wherein a second sealing member 72 is mounted in the second radial gap.

When the wheel rotates around the axle 1 under the driving effect generated by the in-wheel drive system, the housing 91 and the housing cover 92 remain fixed relative to the axle 1.

The mounting space has a substantially uniform axial dimension when extending in the radial direction R. The mounting space comprises a first mounting space and a second mounting space arranged along the axial direction A. The first mounting space is mainly used for mounting the driving motor 3, and the second mounting space is mainly used for mounting the planetary gear reducer, so that the entire planetary gear reducer and the entire driving motor 3 are substantially arranged along the axial direction A. For example, the planetary gear reducer is located on an axial side of the driving motor 3.

The driving motor 3 comprises a stator 31 and a rotor 32. The stator 31 is fixed to the inner radial side of the housing 91 in the first mounting space, and the rotor 32 rotates relative to the stator 31 on the inner radial side of the stator 31, wherein both the rotor 32 and the stator 31 are substantially annular.

The rotor support 4 is substantially cylindrical. The rotor support 4 is fixed to the rotor 32 on the inner radial side of the rotor 32. A supporting bearing 21 is arranged between the rotor support 4 and the second hub portion 23. The supporting bearing 21 supports the rotor support 4 on the outer radial side of the second hub portion 23.

The planetary gear reducer may be a two-stage planetary gear reducer, wherein a first stage planetary gear reducer 5 comprises a sun gear shaft 51, planetary gears 52, a ring gear 50 and a planetary gear carrier 53, and a second stage planetary gear reducer 6 comprises a sun gear shaft 61, planetary gears 62, ring gear 50 and a planetary gear carrier 63.

The sun gear shaft 51 of the first stage planetary gear reducer 5 is a hollow shaft, which is located on an axial side of the rotor support 4 and is integrally formed with the rotor support 4. The sun gear shaft 51 is positioned closer to the inner radial side than the rotor support 4. The planetary gears 52 of the first stage planetary gear reducer 5 mesh with the sun gear shaft 51 on the outer radial side of the sun gear shaft 51, and the planetary gear carrier 53 of the first stage planetary gear reducer 5 is fixed to a shaft of the planetary gear 52 to support the planetary gear 52.

The first stage planetary gear reducer 5 is substantially arranged on an axial side of the rotor support 4.

The sun gear shaft 61 of the second stage planetary gear reducer 6 is a hollow shaft, which is located on an axial side of the planetary gear carrier 53 of the first stage planetary gear reducer 5 and is integrally formed with the planetary gear carrier 53 of the first stage planetary gear reducer 5. The sun gear shaft 61 of the second stage planetary gear reducer 6 and the sun gear shaft 51 of the first stage planetary gear reducer 5 are coaxially arranged and have substantially the same radius. The planetary gears 62 of the second stage planetary gear reducer 6 mesh with the sun gear shaft 61 on the outer radial side of the sun gear shaft 61. The planetary gear carrier 63 of the second stage planetary gear reducer 6 may support (mount) the planetary gears 62 by, e.g., being fixed to a shaft of the planetary gear 62.

The second stage planetary gear reducer 6 is substantially arranged on an axial side of the first stage planetary gear reducer 5.

The planetary gears 52 of the first stage planetary gear reducer 5 and the planetary gears 62 of the second stage planetary gear reducer 6 mesh with the same ring gear 50, wherein the ring gear 50 is located on the outer radial sides of both the planetary gears 52, 62 and is fixed to the inner radial side of the second housing portion 912. The two-stage planetary gear reducer uses the same ring gear 50, thereby reducing the number of parts.

The planetary gear carrier 63 of the second stage planetary gear reducer 6 may be fixedly connected to the hub 2 at the end of the hub 2 on an axial side. In particular, the planetary gear carrier 63 of the second stage planetary gear reducer 6 is fixedly connected to the hub 2 on the inner radial side of the hub 2, which makes full use of the space between the axle portion 12 on an axial side of the supporting bearing 21 and the hub 2, and hence contributes to a compact structure.

Arranging the rotor support 4, the first stage planetary gear reducer 5 and the second stage planetary gear reducer 6 along the axial direction A, arranging the driving motor 3, the first stage planetary gear reducer 5 and the second stage planetary gear reducer 6 along the axial direction A, and fixing the second stage planetary gear reducer 6 to an end of the hub 2 on an axial side are all conducive to reducing the radial dimension of the in-wheel drive system, resulting in a compact structure of the in-wheel drive system, thereby shortening the transmission chain.

A driving force/torque reaches the sun gear shaft 51 of the first stage planetary gear reducer 5 sequentially through the rotor 32 and the rotor support 4. The driving force/torque input through the sun gear shaft 51 of the first stage planetary gear reducer 5 is output from the planetary gear carrier 53 of the first stage planetary gear reducer 5, and is input to the sun gear shaft 61 of the second stage planetary gear reducer 6 that is fixedly connected to and particularly integrally formed with the planetary gear carrier 53 of the first stage planetary gear reducer 5. The driving force/torque input through the sun gear shaft 61 of the second stage planetary gear reducer 6 is output from the planetary gear carrier 63 of the second stage planetary gear reducer 6 and is input to the hub 2 at the same time, causing the hub 2 to drive the rim 8.

Through the use of the two-stage planetary gear reducer, a greater transmission ratio can be obtained within a limited mounting space.

Integrally forming the sun gear shaft 51 of the first stage planetary gear reducer 5 and the rotor support 4 and integrally forming the sun gear shaft 61 of the second stage planetary gear reducer 6 and the planetary gear carrier 53 of the first stage planetary gear reducer 5 are both conducive to reducing the number of parts and optimizing space utilization, thereby improving the overall layout of the in-wheel drive system.

The coaxial arrangement of two or more of the axle 1, the hub 2, the driving motor 3, the planetary gear reducers and the wheel bearing is conducive to reducing the radial dimension of the in-wheel drive system, resulting in a compact structure of the in-wheel drive system, thereby shortening the transmission chain.

In the above-mentioned embodiments, the in-wheel drive system is arranged in an in-wheel space between the outer radial side of the axle 1 and the inner radial side of the rim 8. The in-wheel drive system directly drives the hub 2 at a variable speed to drive a wheel, which removes the need for a conventional transmission half axle, differential, and other transmission parts, is conducive to the vehicle layout design, and can easily implement torque vector control.

A motor vehicle may include the above-mentioned in-wheel drive system. The motor vehicle may be a new energy vehicle, specifically a new energy bus or logistics vehicle. For motor vehicles with a requirement for a large space, a better layout design can be achieved, for example, a more spacious passenger space can be realized.

Those skilled in the art can make various modifications to the above-mentioned implementations.

In addition to the above detailed description, it should also be noted that:

(i) The sun gear shaft 51 of the first stage planetary gear reducer 5 may be separately formed with the rotor support 4, and the sun gear shaft 61 of the second stage planetary gear reducer 6 may be separately formed with the planetary gear carrier 53 of the first stage planetary gear reducer 5.

(ii) The planetary gear carrier 63 of the second stage planetary gear reducer 6 and the hub 2 may be assembled together by interference fit or other common mechanical assembly methods, such as spline fit, provided that the two can be assembled stably to transmit a driving force/torque.

(iii) The planetary gear reducer may include only one stage of planetary gear reducer, or three or more stages of planetary gear reducers.

(iv) It is also possible to mount a braking system on an axial side of the above-mentioned in-wheel drive system.

LIST OF REFERENCE NUMERALS

1 Axle;
11 wheel bearing;
12 axle portion;
13 flange portion;
15 nut;
2 hub;
21 supporting bearing;
22 first hub portion;
23 second hub portion;
3 driving motor;
31 stator;
32 rotor;
4 rotor support;
5 first stage planetary gear reducer;
6 second stage planetary gear reducer;
51, 61 sun gear shafts;
52, 62 planetary gears;
53, 63 planetary gear carriers;
50 ring gear;
71 first sealing member;
72 second sealing member;
8 rim;
91 housing;
911 first housing portion;
912 second housing portion;
913 spacer partition plate;
92 housing cover
A axial direction;
R radial direction.

The invention claimed is:

1. An in-wheel drive system, comprising:
an axle;
a housing;
a housing cover;
a hub;
a driving motor, the driving motor comprising a stator and a rotor that rotates relative to the stator on an inner radial side of the stator;
a rotor support, the rotor support being rotatably supported on an outer radial side of the hub and fixed to the rotor on an inner radial side of the rotor; and
a planetary gear reducer;

wherein the hub is supported on an outer radial side of an axle portion of the axle, the housing is located on the outer radial side of the hub, and the housing cover is located on an axial side of the hub, the housing, the housing cover, the hub, and a flange portion of the axle encircle and form a mounting space for mounting the driving motor and the planetary gear reducer;

wherein a driving torque is transmitted to the hub via the rotor, the rotor support, and the planetary gear reducer.

2. The in-wheel drive system of claim 1, wherein the in-wheel drive system defines a mounting space located at the outer radial side of the hub, the planetary gear reducer and the driving motor are mounted in the mounting space, and the mounting space has a substantially uniform axial dimension when extending in a radial direction.

3. The in-wheel drive system of claim 1, wherein the planetary gear reducer is substantially located on an axial side of the driving motor.

4. The in-wheel drive system of claim 1, wherein the in-wheel drive system further comprises a wheel bearing, wherein the wheel bearing supports the hub on the inner radial side of the hub, and the driving motor, the planetary gear reducer, and the wheel bearing are coaxially arranged.

5. The in-wheel drive system of claim 1, wherein the planetary gear reducer comprises:
   a ring gear;
   a first sun gear fixed to the rotor support;
   a first carrier supporting a set of first planet gears, each of the first planet gears meshing with the first sun gear and the ring gear;
   a second sun gear fixed to the first carrier;
   a second carrier fixed to the hub and supporting a set of second planet gears, each of the second planet gears meshing with the second sun gear and the ring gear.

6. The in-wheel drive system of claim 5, wherein the first sun gear and the rotor support are integrally formed.

7. The in-wheel drive system of claim 5, wherein the second sun gear and the second carrier are integrally formed.

8. The in-wheel drive system of claim 5, wherein the first sun gear and the rotor support are integrally formed, and wherein the second sun gear and the second carrier are integrally formed.

9. A motor vehicle, wherein the motor vehicle comprises the in-wheel drive system of claim 1.

10. An in-wheel drive system, comprising:
    an axle adapted for fixation to a vehicle;
    a hub supported on an outer radial side of an axle portion of the axle and fixed to a rim;
    a housing fixed to the axle, such that the housing and the hub define a mounting space;
    a driving motor mounted in the mounting space, the driving motor comprising a stator and a rotor that rotates relative to the stator;
    a planetary gear reducer mounted in the mounting space and configured to transmit power from the rotor to the hub; and
    a rotor support;
    wherein a driving torque is transmitted to the hub via the rotor, the rotor support, and the planetary gear reducer.

11. The in-wheel drive system of claim 10, wherein the planetary gear reducer is substantially located on an axial side of the driving motor.

12. The in-wheel drive system of claim 10, wherein the planetary gear reducer comprises:
    a ring gear fixed to the housing;
    a first sun gear fixed to the rotor;
    a first carrier supporting a set of first planet gears, each of the first planet gears meshing with the first sun gear and the ring gear;
    a second sun gear fixed to the first carrier;
    a second carrier fixed to the hub and supporting a set of second planet gears, each of the second planet gears meshing with the second sun gear and the ring gear.

13. The in-wheel drive system of claim 12, wherein the first sun gear and the rotor support are integrally formed.

14. The in-wheel drive system of claim 12, wherein the second sun gear and the second carrier are integrally formed.

* * * * *